(12) United States Patent
Chen

(10) Patent No.: US 12,139,268 B2
(45) Date of Patent: Nov. 12, 2024

(54) ADJUSTING AIRCRAFT POWERPLANT POWER SPLIT TO CONTROL POWERPLANT VIBRATIONS

(71) Applicant: Pratt & Whitney Canada Corp., Longueuil (CA)

(72) Inventor: Li-Jen Chen, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 211 days.

(21) Appl. No.: 17/845,590

(22) Filed: Jun. 21, 2022

(65) Prior Publication Data
US 2023/0406523 A1 Dec. 21, 2023

(51) Int. Cl.
*B64D 31/00* (2024.01)
*B64D 27/10* (2006.01)
*B64D 27/24* (2024.01)
*B64D 29/00* (2006.01)
*B64D 35/08* (2006.01)
*B64D 47/00* (2006.01)
*B64D 27/02* (2006.01)

(52) U.S. Cl.
CPC ............. *B64D 31/00* (2013.01); *B64D 27/10* (2013.01); *B64D 27/24* (2013.01); *B64D 29/00* (2013.01); *B64D 35/08* (2013.01); *B64D 47/00* (2013.01); *B64D 27/026* (2024.01)

(58) Field of Classification Search
CPC ........ B64D 31/00; B64D 31/16; B64D 31/18; B64D 27/02; B64D 27/026; B64D 27/24; B64D 27/30; B64D 27/33; B64D 35/08
See application file for complete search history.

(56) References Cited

U.S. PATENT DOCUMENTS

| | | | |
|---|---|---|---|
| 6,712,314 B2 | 3/2004 | Stephan | |
| 10,301,031 B2 | 5/2019 | Colavincenzo | |
| 10,843,807 B2 | 11/2020 | Bevirt | |
| 10,933,977 B2 | 3/2021 | Gartenberg | |
| 2004/0249520 A1* | 12/2004 | Maine | G01M 15/12 701/100 |
| 2010/0038473 A1* | 2/2010 | Schneider | F16F 15/134 184/6.12 |
| 2019/0323427 A1* | 10/2019 | Mackin | F02C 9/16 |
| 2020/0277073 A1 | 9/2020 | Thomassin | |
| 2020/0385133 A1 | 12/2020 | Ruhan | |

(Continued)

FOREIGN PATENT DOCUMENTS

FR 2869018 B1 6/2006

OTHER PUBLICATIONS

EP Search Report for EP Patent Application No. 23180763.7 dated Nov. 6, 2023.

*Primary Examiner* — Michael C Zarroli
*Assistant Examiner* — Ka Chun Leung
(74) *Attorney, Agent, or Firm* — Getz Balich LLC

(57) ABSTRACT

A method is provided for operating a system of an aircraft. During this method, rotation of a propulsor rotor is driven using mechanical power output by a powerplant. The powerplant includes a first drive device and a second drive device. The first drive device generates a first portion of the mechanical power. The second drive device generates a second portion of the mechanical power. A ratio between the first portion of the mechanical power and the second portion of the mechanical power is adjusted to control vibrations of the powerplant.

17 Claims, 6 Drawing Sheets

(56) References Cited

U.S. PATENT DOCUMENTS

2020/0391877 A1\* 12/2020 Erzen .................... B60L 50/50
2021/0062726 A1   3/2021 Kathirchelvan
2022/0065688 A1   3/2022 Ciciriello \* cited by examiner

ADJUSTING AIRCRAFT POWERPLANT POWER SPLIT TO CONTROL POWERPLANT VIBRATIONS

TECHNICAL FIELD

This disclosure relates generally to an aircraft and, more particularly, to controlling vibrations of an aircraft powerplant.

BACKGROUND INFORMATION

A powerplant for an aircraft is subject to vibrations. Various methods are known in the art for monitoring and responding to the powerplant vibrations. While these known powerplant vibration monitoring and response methods have various benefits, there is still room in the art for improvement. There is a need in the art, in particular, for improved systems and methods for monitoring and responding to vibrations of, for example, a hybrid powerplant with a heat engine and an electric motor.

SUMMARY

According to an aspect of the present disclosure, a method is provided for operating a system of an aircraft. During this method, rotation of a propulsor rotor is driven using mechanical power output by a powerplant. The powerplant includes a first drive device and a second drive device. The first drive device generates a first portion of the mechanical power. The second drive device generates a second portion of the mechanical power. A ratio between the first portion of the mechanical power and the second portion of the mechanical power is adjusted to control vibrations of the powerplant.

According to another aspect of the present disclosure, another method is provided for operating an aircraft system. During this method, rotation of a propulsor rotor is driven using mechanical power output by a powerplant. The powerplant includes a heat engine and an electric motor. The heat engine provides a first portion of the mechanical power. The electric motor provides a second portion of the mechanical power. Vibrations of the powerplant are monitored. The vibrations of the powerplant are controlled based on information obtained from the monitoring by one of: increasing the first portion of the mechanical power provided by the heat engine, and decreasing the second portion of the mechanical power provided by the electric motor; or decreasing the first portion of the mechanical power provided by the heat engine, and increasing the second portion of the mechanical power provided by the electric motor.

According to still another aspect of the present disclosure, a system is provided for an aircraft. This aircraft system includes a propulsor rotor, a powerplant and a control system. The powerplant is adapted to output mechanical power to drive rotation of the propulsor rotor. The powerplant includes a first drive device and a second drive device. The first drive device is adapted to provide a first portion of the mechanical power. The second drive device is adapted to provide a second portion of the mechanical power. The control system is adapted to control vibrations of the powerplant by operating the powerplant to adjust a ratio between the first portion of the mechanical power and the second portion of the mechanical power.

The aircraft system may also include a sensor system adapted to provide sensor data to the control system indicative of the vibrations of the powerplant. The control system may be adapted to: determine an actual parameter of the vibrations from the sensor data; and compare the actual parameter to a threshold. The control system may be adapted to operate the powerplant to adjust the ratio between the first portion of the mechanical power and the second portion of the mechanical power based on the comparison of the actual parameter to the threshold.

The first drive device may be configured as or otherwise include a heat engine. In addition or alternatively, the second drive device may be configured as or otherwise include an electric motor.

The ratio between the first portion of the mechanical power and the second portion of the mechanical power may be adjusted without decreasing the mechanical power output by the powerplant to the drive rotation of the propulsor rotor.

The adjusting of the ratio between the first portion of the mechanical power and the second portion of the mechanical power may include one of: increasing the first portion of the mechanical power generated by the first drive device, and decreasing the second portion of the mechanical power generated by the second drive device; or decreasing the first portion of the mechanical power generated by the first drive device, and increasing the second portion of the mechanical power generated by the second drive device.

The ratio between the first portion of the mechanical power and the second portion of the mechanical power may be adjusted to reduce a parameter of the vibrations of the powerplant below a threshold.

The ratio between the first portion of the mechanical power and the second portion of the mechanical power may be adjusted such that a frequency of the vibrations of the powerplant is not coincident with: a natural frequency of an airframe of the aircraft; and/or a frequency of vibrations of an airframe of the aircraft.

The method may also include: obtaining sensor data indicative of the vibrations of the powerplant; determining an actual parameter of the vibrations of the powerplant from the sensor data; and comparing the actual parameter to a threshold. The ratio between the first portion of the mechanical power and the second portion of the mechanical power may be adjusted based on the comparison of the actual parameter to the threshold.

The threshold may be an expected parameter of the vibrations for the ratio between the first portion of the mechanical power and the second portion of the mechanical power prior to the adjusting.

The actual parameter of the vibrations may be one of: an overall level of the vibrations of the powerplant; a frequency composition of the vibrations of the powerplant; or a tonal amplitude of a peak vibration tone of the vibrations of the powerplant.

The sensor data may be obtained using at least a vibration sensor arranged with the first drive device or the second drive device.

The sensor data may be obtained using at least a vibration sensor arranged within a nacelle housing the first drive device and the second drive device.

The first drive device may have a first configuration. The second drive device may have a second configuration that is different than the first configuration.

The first drive device may be configured as or otherwise include a heat engine. The second drive device may be configured as or otherwise include an electric motor.

The heat engine may be configured as or otherwise include a gas turbine engine.

A transmission may mechanically couple the first drive device and the second drive device to the propulsor rotor.

The method may also include: storing data indicative of the vibrations of the powerplant in a memory; and monitoring health of the powerplant based on the stored data.

The adjusting may be performed in response to a vibration mode selected by an aircraft pilot.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
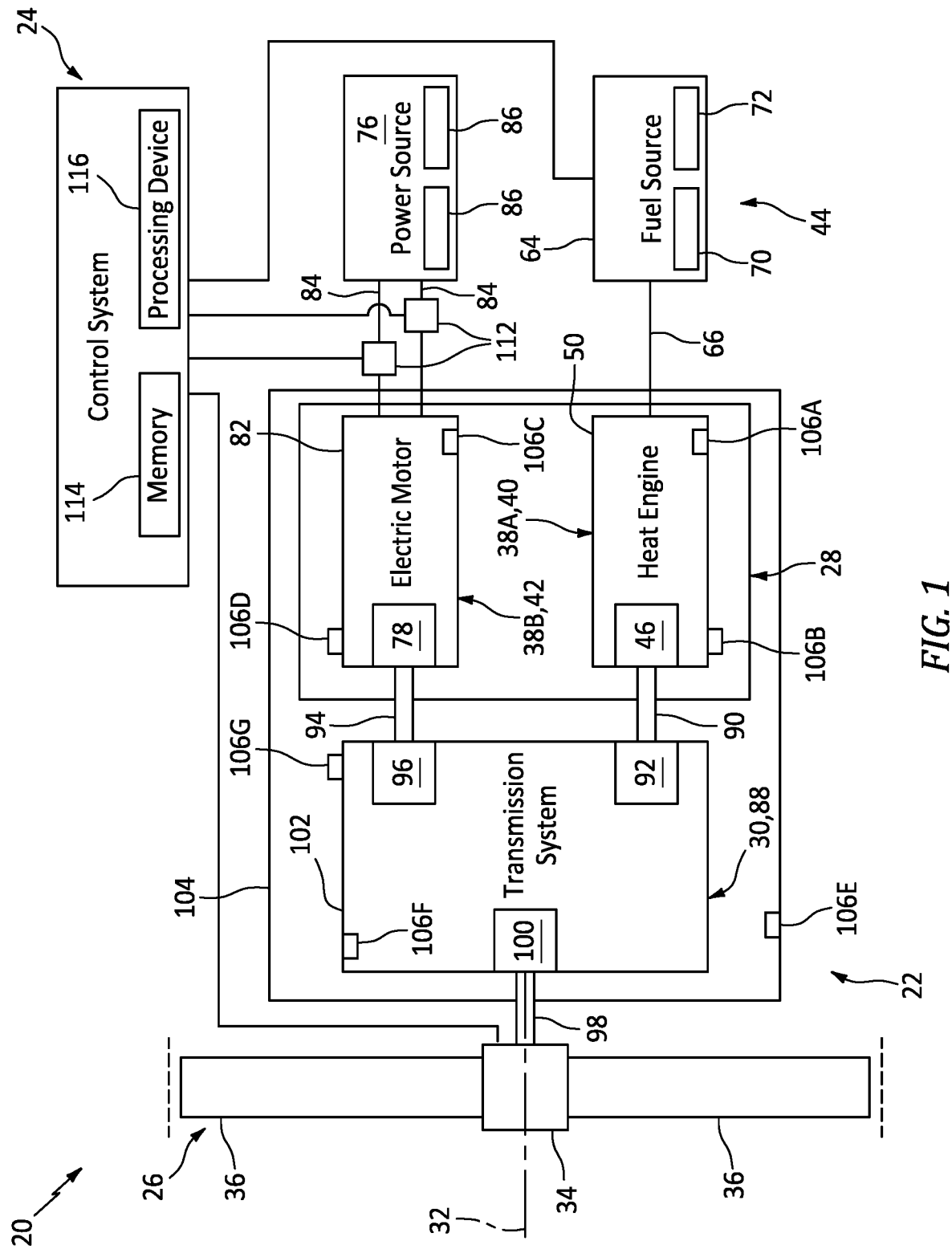
FIG. 1 is a schematic illustration of a propulsion system for an aircraft.

FIG. 1 is a schematic illustration of a propulsion system 20 for an aircraft. This aircraft propulsion system 20 includes a powertrain 22, a sensor system and a control system 24. The powertrain 22 includes a propulsor rotor 26 and an aircraft powerplant 28. The powertrain 22 of FIG. 1 also includes a power transmission system 30 for (e.g., selectively) transmitting mechanical power from the aircraft powerplant 28 to the propulsor rotor 26.

The propulsor rotor 26 may be configured as an open rotor such as a propeller rotor or a helicopter (e.g., main) rotor. Alternatively, the propulsor rotor 26 may be configured as a ducted rotor such as a fan rotor; e.g., see dashed line fan duct. The propulsor rotor 26 is rotatable about a propulsor axis 32, which propulsor axis 32 may be an axial centerline of the propulsor rotor 26. The propulsor rotor 26 includes a propulsor disk 34 and a plurality of propulsor blades 36. The propulsor blades 36 are distributed circumferentially around the propulsor disk 34 in an annular array. Each of the propulsor blades 36 is connected to and projects radially (relative to the propulsor axis 32) out from the propulsor disk 34.

The aircraft powerplant 28 includes a plurality of drive devices 38A and 38B (generally referred to as "38") for driving rotation of the propulsor rotor 26, for example, through the transmission system 30. Examples of the drive devices 38 include, but are not limited to, a heat engine and an electric motor. Examples of the heat engine include, but are not limited to, a gas turbine engine, a reciprocating piston internal combustion (IC) engine and a rotary internal combustion (IC) engine. Examples of the electric motor include, but are not limited to, a dedicated electric motor and an electric machine operatable as an electric motor, where the electric machine may also be operable as an electric generator during select mode(s) of aircraft powerplant operation.

At least one (e.g., each) of the drive devices 38 may have a different configuration than another one of the drive devices 38. Herein, the drive device configuration may describe the type of drive device; e.g., a heat engine drive device versus an electric motor drive device, a gas turbine engine drive device versus a piston engine drive device, etc. The drive device configuration may also or alternatively describe a model of drive device; e.g., a first (e.g., manufacturer) model of drive device versus a second (e.g., manufacturer) model of drive device. The drive device configuration may also or alternatively describe drive devices with different (e.g., normal, maximum, minimum, aircraft cruise, aircraft takeoff, aircraft landing, etc.) operating characteristics. Examples of the operating characteristics include, but are not limited to, power output, torque output, rotor speed, gas path temperature, engine pressure ratio, etc. However, for ease of description, the first drive device 38A is described below as a gas turbine engine 40 (a heat engine) and the second drive device 38B is described as an electric motor 42. With such a configuration, the aircraft powerplant 28 may be referred to as a hybrid powerplant which selectively utilizes both fuel (e.g., via the gas turbine engine 40/the heat engine) and electricity (e.g., via the electric motor 42) to generate the mechanical power output to the propulsor rotor 26.

Figure 2:
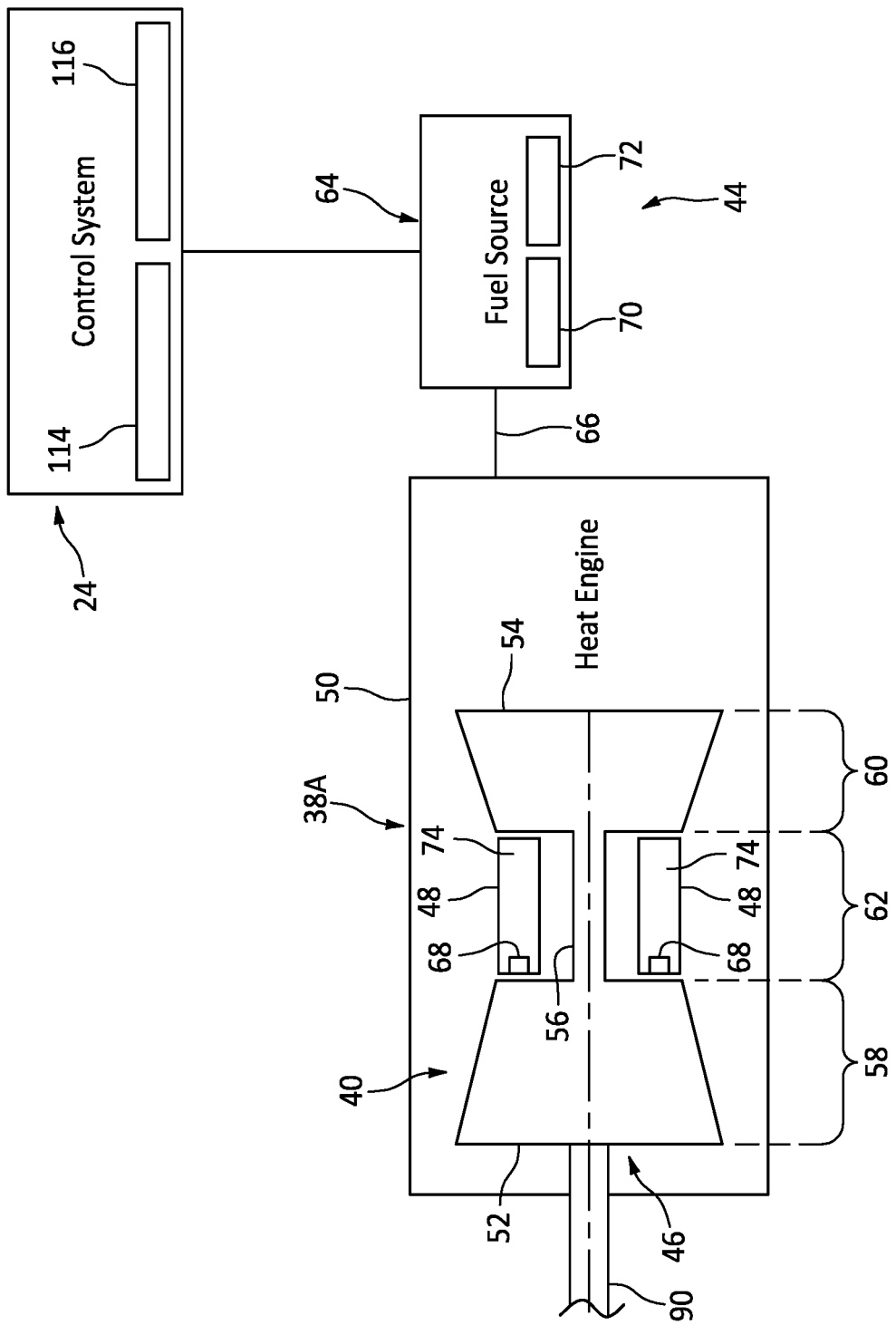
FIG. 2 is a schematic illustration of a gas turbine engine heat engine arranged with a fuel system and a control system.

The gas turbine engine 40 of FIG. 1 is fluidly coupled with and receives fuel from a fuel system 44. The gas turbine engine 40 is adapted to convert chemical energy stored within the fuel into mechanical power. Referring to FIG. 2, the gas turbine engine 40 includes a rotating assembly 46, a combustor 48 and an engine case 50 housing the rotating assembly 46 and the combustor 48. The rotating assembly 46 includes a bladed compressor rotor 52, a bladed turbine rotor 54 and a shaft 56 connecting the compressor rotor 52 to the turbine rotor 54. The compressor rotor 52 is arranged in a compressor section 58 of the gas turbine engine 40. The turbine rotor 54 is arranged within a turbine section 60 of the gas turbine engine 40. The combustor 48 is arranged within a combustor section 62 of the gas turbine engine 40.

The fuel system 44 of FIG. 2 includes a fuel source 64 and at least one fuel line 66. The fuel source 64 is configured to provide the fuel to one or more fuel injectors 68 of the gas turbine engine 40 through the fuel line 66. The fuel source 64 is also configured to store (e.g., contain a quantity of) the fuel before, during and/or after gas turbine engine operation. The fuel source 64 of FIG. 2, for example, includes a fuel reservoir 70 and a fuel flow regulator 72. The fuel flow regulator 72 may be or otherwise include a pump and/or a valve. This fuel flow regulator 72 is configured to direct fuel received from the fuel reservoir 70 to the fuel injectors 68 through the fuel line 66.

During operation of the gas turbine engine 40 of FIG. 2, air enters a gas path within the gas turbine engine 40 through an airflow inlet. The gas path extends sequentially through the compressor section 58, the combustor section 62 and the turbine section 60. This air is compressed by the compressor rotor 52 and directed into a combustion chamber 74 of the combustor 48. The fuel received from the fuel system 44 is injected into the combustion chamber 74 by the fuel injectors 68 and mixed with the compressed air to provide a fuel-air mixture. This fuel-air mixture is ignited and combustion products thereof flow through and cause the turbine rotor 54 to rotate. The rotation of the turbine rotor 54 drives rotation of the compressor rotor 52 and, thus, compression of the air received from the airflow inlet. The rotation of the rotating assembly 46 also provides mechanical power for driving (e.g., rotating) the propulsor rotor 26 of FIG. 1. The present disclosure, however, is not limited to such an exemplary gas turbine engine configuration. The gas turbine engine 40, for example, may be configured with two or more of the rotating assemblies (e.g., spools) with various rotating assembly configurations.

Figure 3:
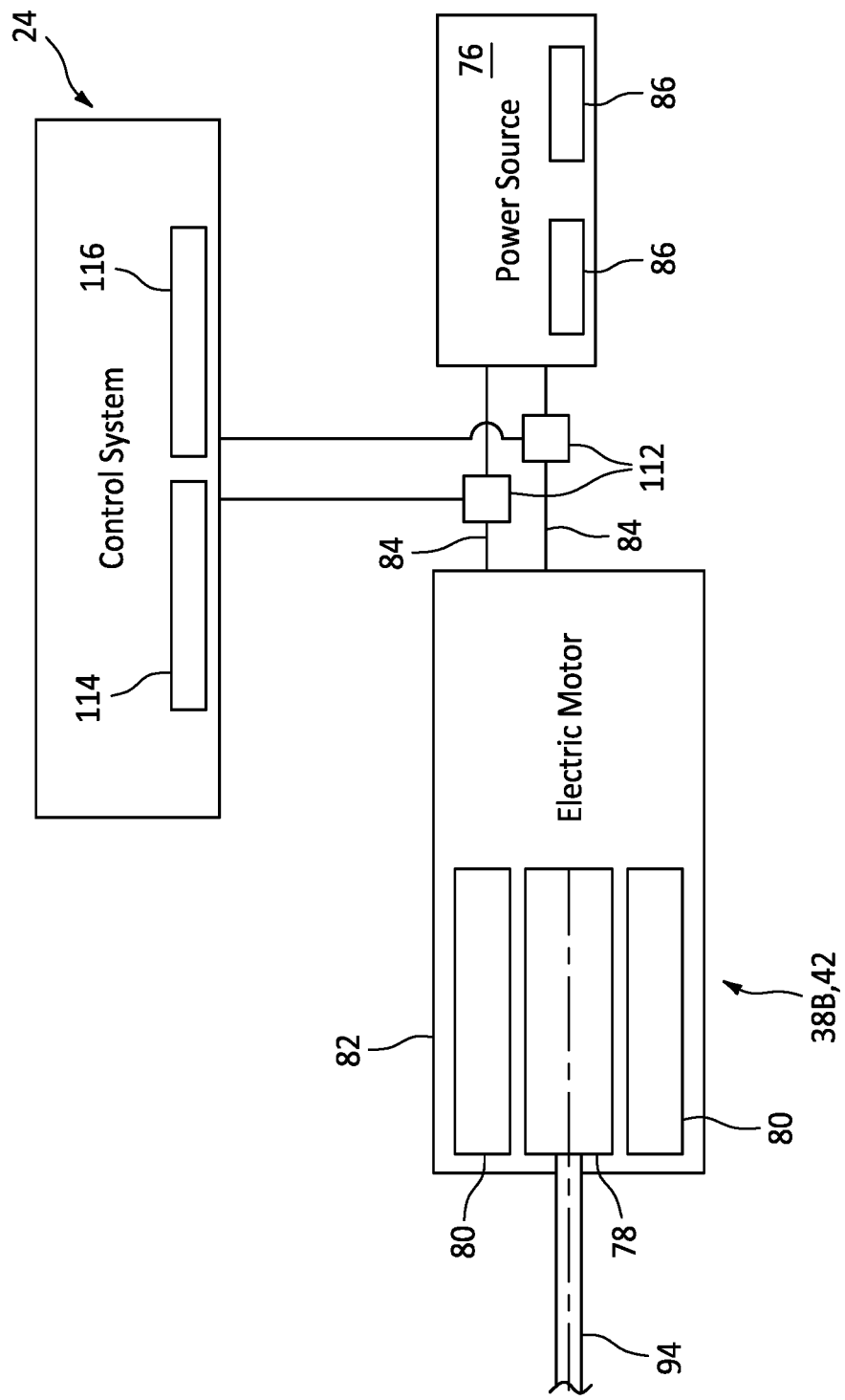
FIG. 3 is a schematic illustration of an electric motor arranged with a power source and the control system.

The electric motor 42 of FIG. 1 is electrically coupled with and receives electricity from a power source 76. The electric motor 42 is adapted to convert electricity received from the power source 76 into mechanical power. This mechanical power may be utilized for various purposes within the aircraft propulsion system 20 such as, for example, rotating the propulsor rotor 26 and/or rotating the rotating assembly 46 within the gas turbine engine 40 (see also FIG. 2) during gas turbine engine startup. Referring to FIG. 3, the electric motor 42 includes an electric motor rotor 78 and an electric motor stator 80, where the motor stator 80 may be radially outboard of and circumscribe the motor rotor 78. The electric motor 42 also includes an electric motor case 82 that at least partially or completely houses the motor rotor 78 and the motor stator 80.

The electric motor 42 is electrically coupled with the power source 76 through one or more electrical leads 84; e.g., high voltage lines. The power source 76 is configured to store electricity. The power source 76 is also configured to provide the stored electricity to the electric motor 42. The power source 76, for example, may be configured as or otherwise include one or more batteries 86; e.g., a battery bank. The power source 76 may also or alternatively include an electric generator powered by the first drive device 38A (e.g., the gas turbine engine 40) or another device (e.g., heat engine).

The transmission system 30 of FIG. 1 may be configured as or otherwise include a geartrain 88. This geartrain 88 is configured to motively couple/operatively connect the first drive device 38A (e.g., the gas turbine engine 40) and the second drive device 38B (e.g., the electric motor 42) to the propulsor rotor 26. A first device coupler 90 (e.g., a shaft), for example, rotatably couples the first drive device 38A and its rotating assembly 46 (see also FIG. 2) to a first component 92 of the geartrain 88; e.g., a gear, a carrier, a shaft, etc. A second device coupler 94 (e.g., a shaft) rotatably couples the second drive device 38B and its rotor 78 (see also FIG. 3) to a second component 96 of the geartrain 88; e.g., a gear, a carrier, a shaft, etc. A propulsor coupler 98 (e.g., a shaft) rotatably couples the propulsor rotor 26 to a third component 100 of the geartrain 88; e.g., a gear, a carrier, a shaft, etc. These geartrain components 92, 96 and 100 are arranged together within a geartrain case 102 such that mechanical power may be transmitted through the geartrain 88 and its geartrain components 92, 96 and 100, for example: (1) from the first drive device 38A to the propulsor rotor 26; and/or (2) from the second drive device 38B to the propulsor rotor 26.

The aircraft powerplant 28 and its drive devices 38 (e.g., the gas turbine engine 40 and the electric motor 42) of FIG. 1 may be housed within a propulsion system nacelle 104. This nacelle 104 provides an aerodynamic cover for the drive devices 38. The nacelle 104 may also house and provide an aerodynamic cover for the transmission system 30. It is further contemplated the nacelle 104 may also house the propulsor rotor 26 where, for example, the propulsor rotor 26 is configured as the ducted rotor.

Figure 5:
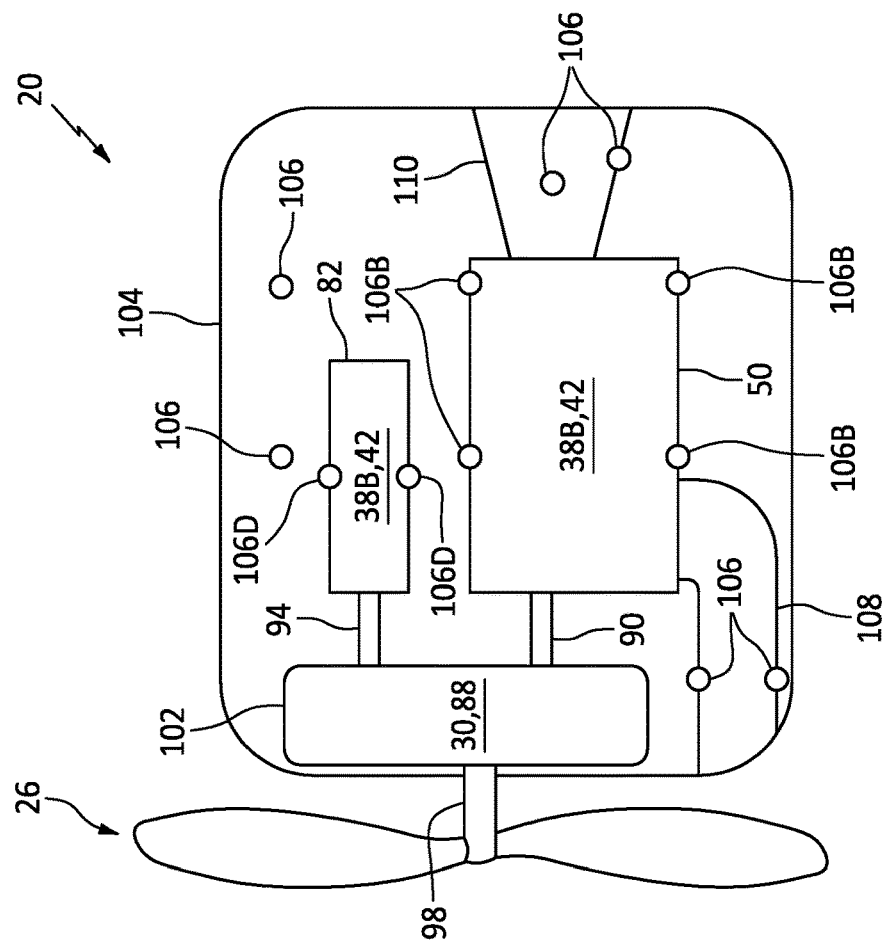
FIG. 5 is another schematic illustration of the aircraft propulsion system arranged with multiple vibration sensors.
Figure 4:
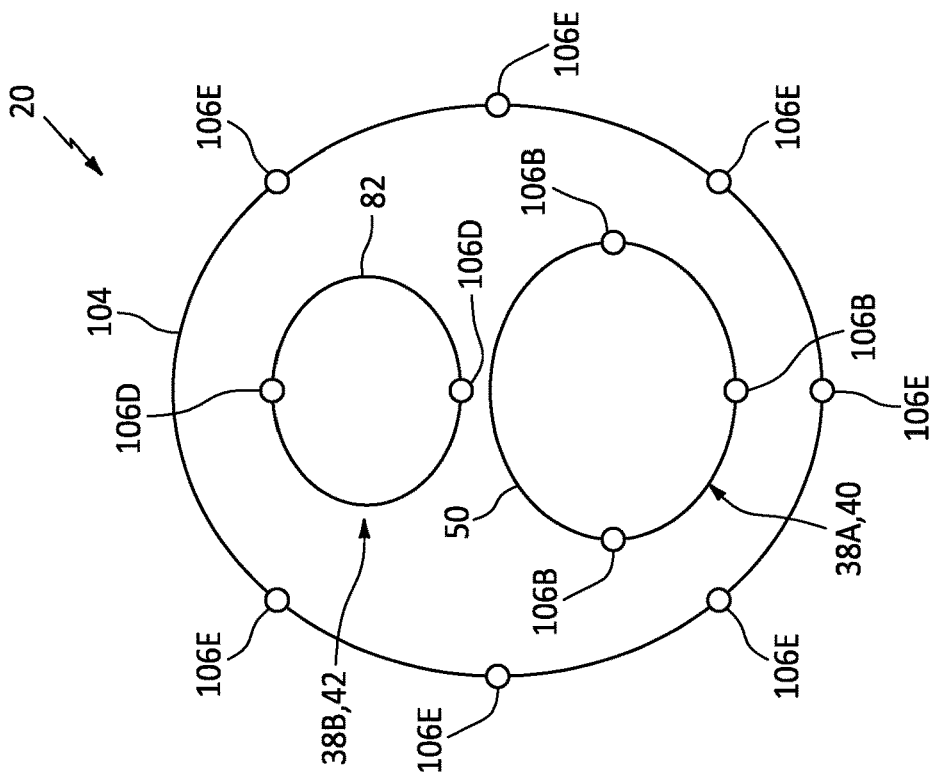
FIG. 4 is a cross-sectional schematic illustration of the aircraft propulsion system with multiple vibration sensors.

The sensor system is adapted to generate sensor data indicative of vibrations of the aircraft powerplant 28 and its drive devices 38. The sensor data may also (or may not) be indicative of vibrations of the transmission system 30. The sensor system of FIG. 1, for example, includes one or more vibration sensors 106A-G (generally referred to as "106") arranged at various locations with the powertrain 22. The vibrations sensors 106A and 106B, for example, are arranged with the first drive device 38A; e.g., the gas turbine engine 40. The vibration sensor 106A, in particular, is located within an interior of the first drive device 38A and, for example, its case 50. Each vibration sensor 106B (see also FIG. 4) is located on and mounted to an exterior of the first drive device 38A and, for example, its case 50. The vibrations sensors 106C and 106D are arranged with the second drive device 38B; e.g., the electric motor 42. The vibration sensor 106C, in particular, is located within an interior of the second drive device 38B and, for example, its case 82. Each vibration sensor 106D (see also FIG. 4) is located on and mounted to an exterior of the second drive device 38B and, for example, its case 82. Each vibration sensor 106E (see also FIG. 4) is arranged within and mounted to an interior (and/or an exterior) of the nacelle 104. The vibrations sensors 106F and 106G are arranged with the transmission system 30; e.g., the geartrain 88. The vibration sensor 106F, in particular, is located within an interior of the transmission system 30 and, for example, its case 102. The vibration sensor 106G is located on and mounted to an exterior of the transmission system 30 and, for example, its case 102. The present disclosure, however, is not limited to the foregoing exemplary vibration sensor locations. One or more of the vibrations sensors 106, for example, may also or alternatively be arranged with and/or mounted to: a heat engine air inlet duct 108 (e.g., see FIG. 5), a heat engine exhaust duct 110 (e.g., see FIG. a mount for one or more of the drive devices 38, etc. Furthermore, any one or more of the powertrain components may be provided with a single vibration sensor 106 or multiple vibration sensors 106.

Each of the vibration sensors 106 may have a common configuration; e.g., each vibration sensor 106 may be the same type of vibration sensor. Alternatively, one or more of the vibration sensors 106 may have a different configuration than one or more of the other vibrations sensors. Examples of the vibration sensors 106 include, but are not limited to, accelerometers, strain gauges, eddy current sensors, laser displacement sensors, gyroscope sensors and vibration meters. The present disclosure, however, is not limited to the foregoing exemplary vibration sensors.

The control system 24 is in signal communication with one or more of propulsion system components and the sensor system. The control system 24, for example, may be hardwired and/or wirelessly coupled with one or more electrical power regulators 112 between the power source 76 and the electric motor 42. The control system 24 may be hardwired and/or wirelessly coupled with the fuel source 64 and its fuel flow regulator 72. The control system 24 may be hardwired and/or wirelessly coupled with one or more of the vibration sensors 106.

The control system 24 may be implemented with a combination of hardware and software. The hardware may include memory 114 and at least one processing device 116, which processing device 116 may include one or more single-core and/or multi-core processors. The hardware may also or alternatively include analog and/or digital circuitry other than that described above.

The memory 114 is configured to store software (e.g., program instructions) for execution by the processing device 116, which software execution may control and/or facilitate performance of one or more operations such as those described in the methods below. The memory 114 may be a non-transitory computer readable medium. For example, the memory 114 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 6:
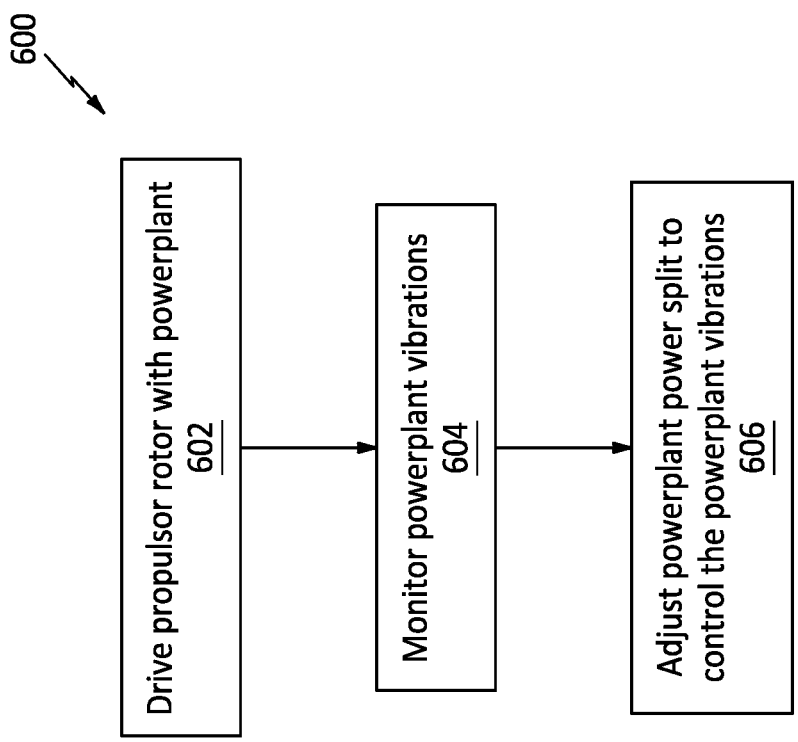
FIG. 6 is a flow diagram of a method for operating an aircraft propulsion system.

FIG. 6 is a flow diagram of a method 600 for operating an aircraft propulsion system. For ease of description, this operating method 600 is described below with reference to the aircraft propulsion system 20 of FIG. 1. The operating method 600 of the present disclosure, however, is not limited to such an exemplary aircraft propulsion system.

In step 602, the aircraft powerplant 28 is operated to drive rotation of the propulsor rotor 26 and produce aircraft propulsion system thrust; e.g., aircraft thrust. The first drive device 38A (e.g., the gas turbine engine 40 of FIG. 2/the heat engine) is operated to convert chemical energy stored within the fuel received from the fuel system 44 into first mechanical power. This first drive device 38A inputs the first mechanical power into the transmission system 30 and its geartrain 88. Concurrently (during at least one or more modes of operation), the electric motor 42 is operated to convert electricity received from the power source 76 into second mechanical power. The electric motor 42 inputs this second mechanical power into the transmission system 30 and its geartrain 88. Within the transmission system 30 and its geartrain 88, the first mechanical power and the second mechanical power may be combined together to provide powerplant mechanical power; e.g., a total mechanical power provided (e.g., output) by the aircraft powerplant 28. This powerplant mechanical power is transferred from the transmission system 30 and its geartrain 88 to the propulsor rotor 26, where the powerplant mechanically power drives rotation of the propulsor rotor 26 about its propulsor axis 32. This rotation of the propulsor rotor 26 in turn generates part or all thrust generated by the aircraft propulsion system 20; e.g., thrust for the aircraft.

The first mechanical power provided by the first drive device 38A accounts for a first portion of the powerplant mechanical power. The second mechanical power provided (e.g., generated) by the second drive device 38B accounts for a second portion of the powerplant mechanical power. Where the first drive device 38A is configured as the gas turbine engine 40 (or another heat engine) and the second drive device 38B is configured as the electric motor 42, the first portion of the powerplant mechanical power may be greater than the second portion of the powerplant mechanical power in some embodiments. The first portion of the powerplant mechanical power, for example, may account for a majority of the powerplant mechanical power. The first portion of the powerplant mechanical power, more particularly, may account for at least sixty percent (60%), seventy percent (70%), eighty percent (80%) or more of the powerplant mechanical power. The present disclosure, however, is not limited to such an exemplary first drive device power output. For example, in other embodiments, the first portion of the powerplant mechanical power may be substantially equal to (or less than) the second portion of the powerplant mechanical power.

Figure 7:
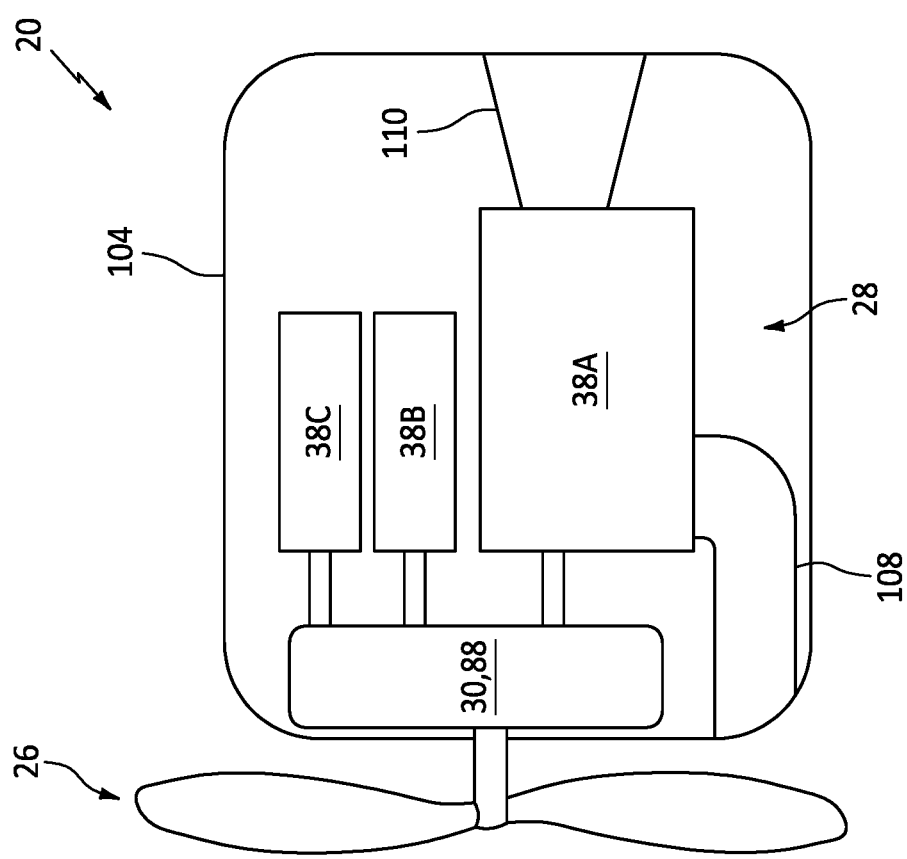
FIG. 7 is a schematic illustration of the aircraft propulsion system with an additional drive device.

Operation of the aircraft powerplant 28 may be characterized by a power split between the first drive device 38A and the second drive device 38B (and other drive devices 38 when included; e.g., see FIG. 7). This power split describes a ratio between the first portion of the powerplant mechanical power provided by the first drive device 38A and the second portion of the powerplant mechanical power provided by the second drive device 38B. In general, the power split may be selected based on a mode of aircraft operation. For example, when the aircraft is taking off, the aircraft powerplant 28 may operate with a takeoff power split. When the aircraft is at cruise, the aircraft powerplant 28 may operate with a cruise power split. When the aircraft is landing, the aircraft powerplant 28 may operate with a landing power split. However, the power split may be tailored (e.g., refined or altered) or overridden based on various additional factors such as powerplant vibrations as described below.

In step 604, the powerplant vibrations are monitored. The powerplant vibrations may describe vibrations generated by the aircraft powerplant 28 and/or resulting from operation of the aircraft powerplant 28. The powerplant vibrations, for example, may include any one or more of the following vibrations: vibrations in the first drive device 38A; vibrations in the second drive device 38B; vibrations in the nacelle 104; and/or vibrations in the transmission system 30.

The sensor system may measure some or all of the powerplant vibrations using its vibration sensors 106. The vibration sensors 106A and 106B, for example, may measure vibrations associated with the first drive device 38A. The vibration sensors 106C and 106D may measure vibrations associated with the second drive device 38B. The vibration sensors 106E may measure vibrations associated with the nacelle 104. The vibration sensors 106F and 106G may measure vibrations associated with the transmission system 30. One or more or all of the measured vibrations may characterize/be indicative of a vibration signature of the aircraft powerplant 28. The vibration signature may be indicative of: an overall level of vibrations of the aircraft powerplant 28; a frequency composition of vibrations of the aircraft powerplant 28; and/or a tonal amplitude (or amplitudes) of a peak vibration tone (or peak vibration tones) of vibrations of the aircraft powerplant 28. The sensor system outputs sensor data indicative of the measured vibrations of the aircraft powerplant 28.

The control system 24 may process the sensor data to determine one or more actual (e.g., measured, determined, etc.) parameters of the powerplant vibrations for each vibration sensor. Examples of these actual parameters include, but are not limited to: the overall level of vibrations of the aircraft powerplant 28; the frequency composition of vibrations of the aircraft powerplant 28; and the tonal amplitude (or amplitudes) of a peak vibration tone (or peak vibration tones) of vibrations of the aircraft powerplant 28. The control system 24 may compare each actual parameter (or select actual parameters) to a corresponding threshold. The control system 24, for example, may compare each actual parameter to an expected parameter for the power split during which the sensor data was obtained by the vibration sensors 106. Where the actual parameter is equal to or below the expected parameter (e.g., the threshold), then the sensor system and the control system 24 may continue to monitor the powerplant vibrations. However, where the actual parameter is greater than the expected parameter (e.g., the threshold), the control system 24 may continue to the next method step 606.

In addition to comparing the actual parameter(s) to the expected parameter(s) (e.g., thresholds), the control system 24 may also store data indicative of the actual parameter(s) and/or the raw sensor data within the memory 114 (or another memory outside of the control system 24) for later retrieval. This vibration data, for example, may be used to monitor health of the aircraft powerplant 28 as described below in further detail.

In step 606, the power split/the ratio between the first and the second portions of the powerplant mechanical power is adjusted based on information obtained during the monitoring of the powerplant vibrations. For example, where any one or more of the actual parameters is greater than its expected parameter (e.g., threshold), the control system 24 may signal the aircraft powerplant 28 to adjust the power split between the first drive device 38A and the second drive device 38B. This power split may be adjusted to control the powerplant vibrations. For example, the first portion of the powerplant mechanical power generated by the first drive device 38A may be increased and the second portion of the powerplant mechanical power generated by the second drive device 38B may be decreased, or vice versa. By changing the power split between the first drive device 38A and the second drive device 38B, the control system 24 may control (e.g., decrease) the powerplant vibrations and/or change a characteristic of the powerplant vibrations. The control system 24 may subsequently operate in a feedback loop with the sensor system to, for example, maintain the powerplant vibrations/the actual parameters at to below a threshold/thresholds. However, although the power split is adjusted, the overall powerplant mechanical power output by the powerplant 28 may remain the same, or at least may not decrease.

The control system 24 may also or alternatively control the power split to drive one or more frequencies of the powerplant vibrations away from one or more natural frequencies of an airframe of the aircraft, which aircraft airframe includes an aircraft fuselage, aircraft wings, aircraft stabilizers, etc. The control system 24, for example, may process the sensor data to determine a frequency (or frequencies) of the powerplant vibrations, and compare the vibration frequency to a threshold (or another parameter) associated with a natural frequency of the aircraft airframe. If the vibration frequency is equal to or greater than the threshold, the controller may signal the aircraft powerplant 28 to adjust its power split between the drive devices 38 to keep the vibration frequency and the airframe natural frequency discrete; e.g., non-coincident, different, buffered from one another. A similar process may also or alternatively be performed to keep the vibration frequency and a frequency (or frequencies) of vibrations of the aircraft airframe discrete.

In some embodiments, the adjustment of the power split to control powerplant vibrations may also or alternatively be triggered by an aircraft pilot. For example, there may be circumstances where the pilot may want to reduce powerplant vibrations, for example, at the expense of powerplant efficiency, etc. During such circumstances, the pilot may trigger a (e.g., whisper) mode where the power split is adjusted to reduce the powerplant vibrations. However, when the reduction of powerplant vibrations is no longer needed (or would interfere with another mode of powerplant operation), the control system 24 may automatically (or again may be triggered by the pilot) revert to the original power split.

In some embodiments, the stored vibration data may be reviewed/processed to monitor health of the aircraft powerplant 28. For example, where one of the drive devices 38 has an unexpected increase in vibrations, it may be determined that one or more parts of that drive device 38 is wearing and/or the drive device 38 will require future maintenance. The timing of the future maintenance may be determined based on a severity of the vibrations/a slope of change in the vibrations. This health monitoring may be performed by a computer offboard the aircraft where the stored vibration data is downloaded. It is also contemplated, however, that the health monitoring may be performed by the control system 24 or otherwise onboard the aircraft.

In some embodiments, referring to FIG. 7, the aircraft powerplant 28 may include more than two of the drive devices; e.g., 38A, 38B and 38C. Each of these drive devices 38 may have a different configuration. Alternatively, at least one of the drive devices 38 may have a different configuration than the other drive devices 38. In either case, the control system 24 may adjust the power split between the various drive devices 38 to control (e.g., reduce) the powerplant vibrations.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating a system of an aircraft, comprising:
    driving rotation of a propulsor rotor using mechanical power output by a powerplant, the powerplant comprising a first drive device and a second drive device, the first drive device generating a first portion of the mechanical power, and the second drive device generating a second portion of the mechanical power;
    obtaining sensor data indicative of vibrations of the powerplant;
    determining an actual parameter of the vibrations of the powerplant from the sensor data;
    comparing the actual parameter to a threshold; and
    adjusting a ratio between the first portion of the mechanical power and the second portion of the mechanical power to control the vibrations of the powerplant, the ratio between the first portion of the mechanical power and the second portion of the mechanical power adjusted based on the comparison of the actual parameter to the threshold.

2. The method of claim 1, wherein
    the first drive device comprises a heat engine; and
    the second drive device comprises an electric motor.

3. The method of claim 2, wherein the heat engine comprises a gas turbine engine.

4. The method of claim 1, wherein the ratio between the first portion of the mechanical power and the second portion of the mechanical power is adjusted without decreasing the mechanical power output by the powerplant to the drive rotation of the propulsor rotor.

5. The method of claim 1, wherein the adjusting of the ratio between the first portion of the mechanical power and the second portion of the mechanical power comprises one of
    increasing the first portion of the mechanical power generated by the first drive device, and decreasing the second portion of the mechanical power generated by the second drive device; or decreasing the first portion of the mechanical power generated by the first drive device, and increasing the second portion of the mechanical power generated by the second drive device.

6. The method of claim 1, wherein the ratio between the first portion of the mechanical power and the second portion of the mechanical power is adjusted to reduce a parameter of the vibrations of the powerplant below a threshold.

7. The method of claim 1, wherein the ratio between the first portion of the mechanical power and the second portion of the mechanical power is adjusted such that a frequency of the vibrations of the powerplant is not coincident with at least one of
   a natural frequency of an airframe of the aircraft; or
   a frequency of vibrations of an airframe of the aircraft.

8. The method of claim 1, wherein the threshold comprises an expected parameter of the vibrations for the ratio between the first portion of the mechanical power and the second portion of the mechanical power prior to the adjusting.

9. The method of claim 1, wherein the actual parameter of the vibrations comprises one of
   an overall level of the vibrations of the powerplant;
   a frequency composition of the vibrations of the powerplant; and
   a tonal amplitude of a peak vibration tone of the vibrations of the powerplant.

10. The method of claim 1, wherein the sensor data is obtained using at least a vibration sensor arranged with the first drive device or the second drive device.

11. The method of claim 1, wherein the sensor data is obtained using at least a vibration sensor arranged within a nacelle housing the first drive device and the second drive device.

12. The method of claim 1, wherein
   the first drive device has a first configuration; and
   the second drive device has a second configuration that is different than the first configuration.

13. The method of claim 1, wherein a transmission mechanically couples the first drive device and the second drive device to the propulsor rotor.

14. The method of claim 1, further comprising:
   storing data indicative of the vibrations of the powerplant in a memory; and
   monitoring health of the powerplant based on the stored data.

15. The method of claim 1, wherein the adjusting is performed in response to a vibration mode selected by an aircraft pilot.

16. A system for an aircraft, comprising:
   a propulsor rotor;
   a powerplant adapted to output mechanical power to drive rotation of the propulsor rotor, the powerplant comprising a first drive device and a second drive device, the first drive device adapted to provide a first portion of the mechanical power, and the second drive device adapted to provide a second portion of the mechanical power;
   a control system adapted to control vibrations of the powerplant by operating the powerplant to adjust a ratio between the first portion of the mechanical power and the second portion of the mechanical power;
   a sensor system adapted to provide sensor data to the control system indicative of the vibrations of the powerplant;
   the control system further adapted to
      determine an actual parameter of the vibrations from the sensor data; and
      compare the actual parameter to a threshold; and
   the control system adapted to operate the powerplant to adjust the ratio between the first portion of the mechanical power and the second portion of the mechanical power based on the comparison of the actual parameter to the threshold.

17. The system of claim 16, wherein at least one of
   the first drive device comprises a heat engine; or
   the second drive device comprises an electric motor.

* * * * *